(12) United States Patent
Asuke et al.

(10) Patent No.: US 8,519,683 B2
(45) Date of Patent: Aug. 27, 2013

(54) DC-DC CONVERTER

(75) Inventors: Hideki Asuke, Niiza (JP); Hideharu Takano, Niiza (JP); Masayoshi Yamamoto, Matsue (JP)

(73) Assignees: Sanken Electric Co., Ltd., Niiza-shi (JP); National University Corporation Shimane University, Matsue-shi (JP)

( * ) Notice: Subject to any disclaimer, the term of this patent is extended or adjusted under 35 U.S.C. 154(b) by 148 days.

(21) Appl. No.: 13/094,121

(22) Filed: Apr. 26, 2011

(65) Prior Publication Data

US 2011/0273913 A1    Nov. 10, 2011

(30) Foreign Application Priority Data

May 10, 2010    (JP) ................................. 2010-108131

(51) Int. Cl.
*G05F 1/24*    (2006.01)
*G05F 1/253*    (2006.01)

(52) U.S. Cl.
USPC .......................................... 323/259; 323/262

(58) Field of Classification Search
USPC .......................................... 323/259, 262, 263
See application file for complete search history.

(56) References Cited

U.S. PATENT DOCUMENTS

| | | | | |
|---|---|---|---|---|
| 6,034,514 | A * | 3/2000 | Sakai | 323/225 |
| 7,183,753 | B2 * | 2/2007 | Tsuruya | 323/222 |
| 7,183,754 | B2 * | 2/2007 | Tsuruya | 323/222 |
| 7,233,507 | B2 * | 6/2007 | Schenk | 323/222 |
| 7,276,884 | B2 * | 10/2007 | Tsuruya | 323/262 |
| 7,579,814 | B2 * | 8/2009 | Orr | 323/262 |
| 7,638,900 | B2 * | 12/2009 | Asuke et al. | 307/81 |
| 7,915,875 | B2 | 3/2011 | Asuke et al. | |
| 2009/0262557 | A1 * | 10/2009 | Asuke et al. | 363/18 |
| 2010/0019743 | A1 * | 1/2010 | Asuke et al. | 323/247 |
| 2011/0090716 | A1 | 4/2011 | Asuke et al. | |

FOREIGN PATENT DOCUMENTS

| | | |
|---|---|---|
| CN | 1219299 A | 6/1999 |
| CN | 1956304 A | 5/2007 |
| JP | 2010-4704 | 1/2010 |

OTHER PUBLICATIONS

Chinese Office Action mailed Jul. 3, 2013 in Chinese Application No. 201110116187.8.

* cited by examiner

*Primary Examiner* — Jue Zhang
(74) *Attorney, Agent, or Firm* — Oblon, Spivak, McClelland, Maier & Neustadt, L.L.P.

(57) ABSTRACT

The present invention includes: a main switch Tr1 connected to two ends of a DC power supply Vi via a first primary winding 1a and a second primary winding 1b, connected to the first primary winding in series, of a transformer T1; a series circuit connected to the two ends of the main switch, and including a reactor L1, a diode D1, a smoothing capacitor Co and a hoist winding 1c connected to the second primary winding in series; a series circuit connected to the two ends of the main switch, and including a diode D2, a diode D3 and the smoothing capacitor; a control circuit 10 to turn on and off the main switch; a soft-switching circuit Da1, Tra1, La1, Ca1 to cause the main switch to perform a soft-switching operation each time the main switch turns on; and a switching control circuit 20 to switch the soft-switching circuit between operating and non-operating modes in accordance with the state of a load.

5 Claims, 7 Drawing Sheets

US 8,519,683 B2

DC-DC CONVERTER

TECHNICAL FIELD

The present invention relates to a DC-DC converter including a boost chopper circuit, and particularly to the DC-DC converter applied to hybrid vehicles and electric vehicles.

BACKGROUND ART

In recent years, development of hybrid vehicles and electric vehicles has been urged against the background of various problems related to the global environment, energy and the like. Motors mounted on these vehicles can achieve higher power by being driven with a higher voltage produced by a voltage booster circuit added in a stage preceding a motor drive power converter. Furthermore, there has recently been a growing demand that the performance of onboard power converters for motors be enhanced through higher-frequency switching.

Nowadays, as a boost converter, a multi-phase trans-linked boost chopper circuit is described in Japanese Patent Application Publication No. 2010-4704. The multi-phase trans-linked boost chopper circuit is capable of suppressing increase in switching loss, which occurs due to the higher-frequency switching, by suppressing the switching loss during diode recovery and in the turning-on of switches.

In the boost chopper circuit described in Japanese Patent Application Publication No. 2010-4704, a first switch is connected to the two ends of a DC power supply via a primary winding of a first transformer and a first reactor, and a second switch is connected to the two ends of the DC power supply via a primary winding of a second transformer and a second reactor. A first series circuit including a hoist winding of the first transformer, a first diode and a smoothing capacitor is connected to the two ends of a series circuit including the first reactor and the first switch. The hoist winding of the first transformer is connected to the primary winding of the first transformer in series. A second diode is connected to a connection point between the first reactor and the first switch, as well as to one end of the smoothing capacitor.

A second series circuit including a hoist winding of the second transformer, a third diode and the smoothing capacitor is connected to the two ends of a series circuit including the second reactor and the second switch. The hoist winding of the second transformer is connected to the primary winding of the second transformer in series. A fourth diode is connected to a connection point between the second reactor and the second switch, as well as to the one end of the smoothing capacitor. A third reactor is connected to the two ends of a series circuit in which a secondary winding of the first transformer and a secondary winding of the second transformer are connected together in series. A control circuit is configured to alternately turn on the first switch and the second switch at half-cycle intervals while keeping the first switch off during the ON period of the second switch, and the second switch off during the ON period of the first switch.

This configuration is capable of suppressing recovery loss in the first, second, third and fourth diodes, as well as switching loss in the turning-on of the first and second switches because: the first reactor is connected to the first switch in series; and the second reactor is connected to the second switch in series.

However, this configuration is still not capable of reducing switching loss in the turning-off of the switches. As the output from the power converter becomes larger, the switching loss which occurs when the larger power is converted by the switching becomes larger.

SUMMARY OF INVENTION

An object of the present invention is to provide a DC-DC converter capable of reducing switching loss in the turning-off of the switches.

The invention according to claim 1 comprises a main switch connected to two ends of a DC power supply via a first primary winding and a second primary winding of a transformer, the second primary winding connected to the first primary winding in series; a first series circuit connected to two ends of the main switch, and including a hoist winding, a first reactor, a first diode and a smoothing capacitor, the hoist winding connected to the second primary winding in series; a second series circuit connected to the two ends of the main switch, and including a second diode, a third diode and the smoothing capacitor; a soft-switching circuit configured to cause the main switch to perform a soft-switching operation each time the main switch turns off; a control circuit configured to turn on and off the main switch; and a switching control circuit configured to switch the soft-switching circuit between an operating mode and a non-operating mode in accordance with a state of a load.

DESCRIPTION OF EMBODIMENTS

Figure 1:
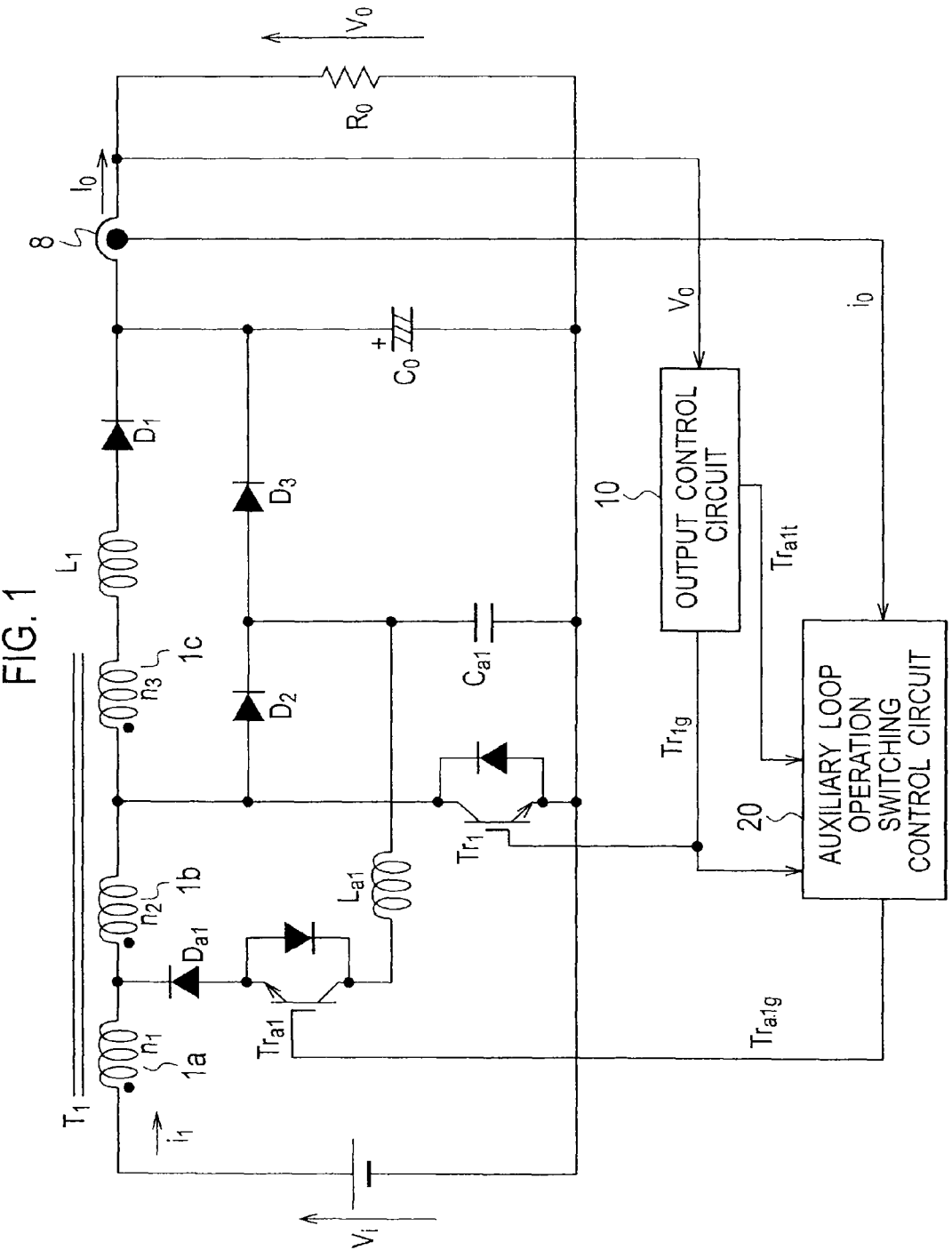
FIG. 1 is a circuit configuration diagram showing a DC-DC converter of Example 1.

Detailed descriptions will be hereinbelow provided for embodiments of a DC-DC converter of the present invention while referring to the drawings.

EXAMPLE 1

FIG. 1 is a circuit configuration diagram showing a DC-DC converter of Example 1. The DC-DC converter shown in FIG. 1 is a single-phase boost chopper circuit. The DC-DC converter is characterized by including a diode Da1, an auxiliary switch Tra1, a reactor La1 and a capacitor Ca1, as well as a soft-switching circuit configured to soft-switch a main switch Tr1 each time the main switch Tr1 turns off. Furthermore, the DC-DC converter is characterized by including an auxiliary loop operation switching control circuit 20 configured to switch the soft-switching circuit between an operating mode and a non-operating mode in accordance with the state of a load Ro.

To put it specifically, the switching loss is not so large when the state of the load Ro is light, for example, during constant-speed running, but the switching loss is large when the state of the load Ro is heavy, for example, during acceleration. For this reason, when the load is heavy, the soft-switching circuit is put in operation, and thereby, the switching loss which occurs each time the main switch Tr1 is turned off is reduced.

The DC-DC converter includes a DC power supply Vi, a transformer T1, a reactor L1 (a first reactor), the reactor La1 (a second reactor), the main switch Tr1, the auxiliary switch Tra1, diodes D1, D2, D3, Da1, the capacitor Ca1, a smoothing capacitor Co, an output control circuit 10, and the auxiliary loop operation switching control circuit 20. The transformer T1 includes: a first primary winding 1a (the number of turns: n1), the second primary winding 1b (the number of turns: n2) connected to the first primary winding 1a in series; and a hoist winding 1c (the number of turns: n3) connected to the second primary winding 1b in series.

The collector and emitter of the main switch Tr1 made from an IGBT (insulated gate bipolar transistor) are respectively connected to the two ends of the DC power supply Vi via the first primary winding 1a and the second primary winding 1b of the transformer T1. A series circuit including the hoist winding 1c of the transformer T1, the reactor L1, the diode D1 and the smoothing capacitor Co is connected to the two ends of the main switch Tr1. The reactor L1 may be a leakage inductance of the transformer T1. In addition, a series circuit including the diode D2, the diode D3 and the smoothing capacitor Co is connected to the two ends of the main switch Tr1. The load Ro is connected to the two ends of the smoothing capacitor Co. An electric current sensor 8 configured to sense an electric current (an output current) io flowing through the load Ro is inserted between the smoothing capacitor Co and the load Ro.

One end of a series circuit including the diode Da1, the auxiliary switch Tra1 made from an IGBT, the reactor La1 and the capacitor Ca1 is connected to a connection point between the first primary winding 1a and the second primary winding 1b of the transformer T1, and the other end of the series circuit is connected to the negative electrode of the DC power supply Vi. A connection point between the reactor La1 and the capacitor Ca1 is connected to a connection point between the diode D2 and the diode D3. The diode Da1, the auxiliary switch Tra1, the reactor La1 and the capacitor Ca1 constitute the soft-switching circuit.

The output control circuit 10 turns on and off the main switch Tr1 based on an output voltage Vo from the load Ro. The electric current sensor 8 senses the electric current io flowing through the load Ro. The auxiliary loop operation switching control circuit 20 switches the soft-switching circuit between the operating mode and the non-operating mode based on the electric current io sensed by the electric current sensor 8, that is to say, in accordance with the state of the load Ro (an amount of load).

Figure 2:
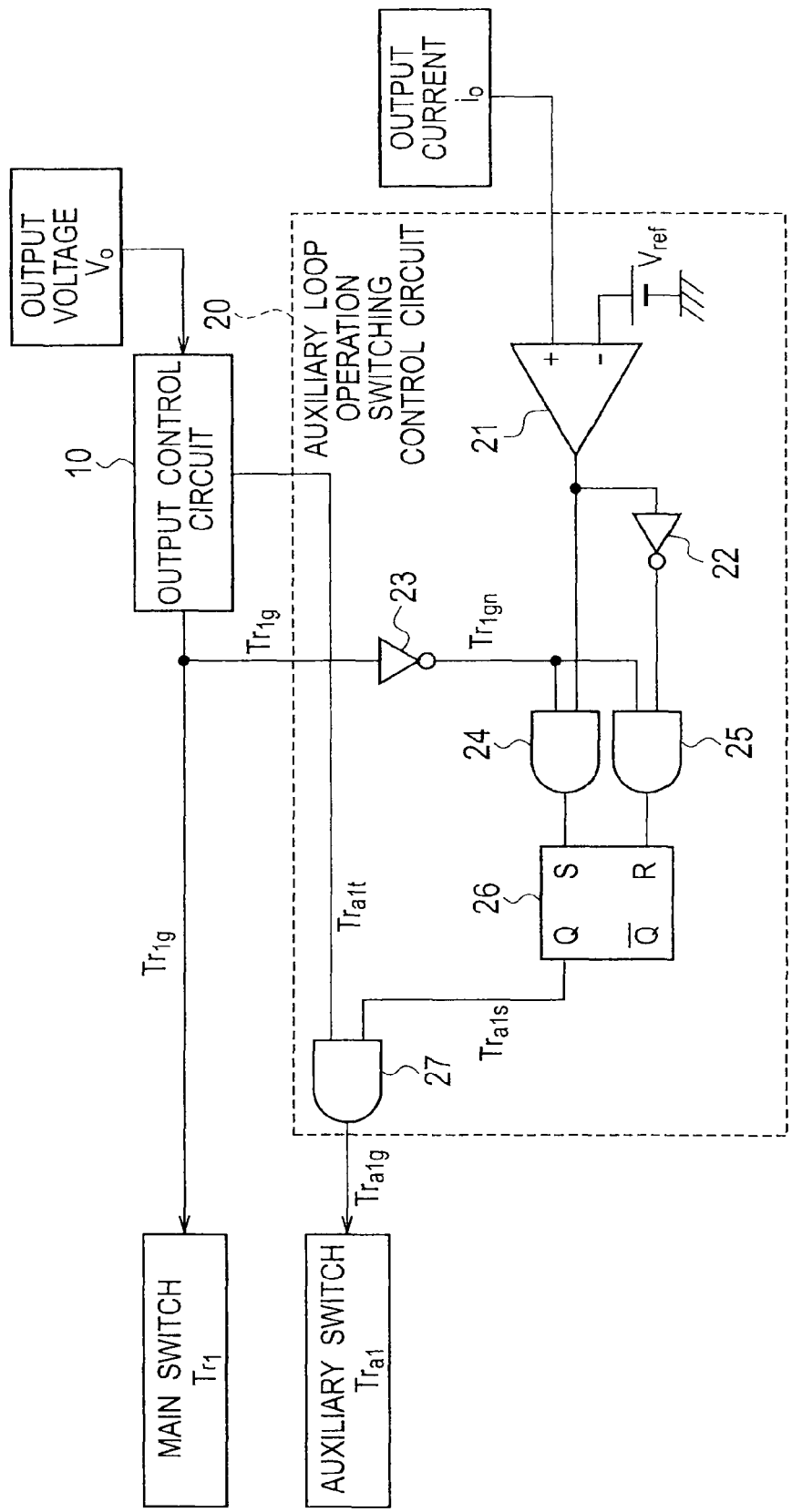
FIG. 2 is a circuit configuration diagram of an auxiliary loop operation switching control circuit provided in the DC-DC converter of Example 1.

FIG. 2 is a circuit configuration diagram of an auxiliary loop operation switching control circuit provided in the DC-DC converter of Example 1. The auxiliary loop operation switching control circuit 20 includes a comparator 21, inverters 22, 23, AND circuits 24, 25, a flip-flop circuit 26 and an AND circuit 27.

A reference voltage Vref is applied to the inversion terminal of the comparator 21, and a voltage based on the output current io is applied to the non-inversion terminal of the comparator 21. A first input terminal of the AND circuit 24 and the input terminal of the inverter 22 are connected to the output terminal of the comparator 21. The output terminal of the inverter 22 is connected to a first input terminal of the AND circuit 25.

The input terminal of the inverter 23 is connected to an output of the output control circuit 10 (i.e., an output of a main switch gate signal Tr1g). The output terminal of the inverter 23 is connected to a second input terminal of the AND circuit 24 and a second input terminal of the AND circuit 25. The output terminal of the AND circuit 24 is connected to the set terminal S of the flip-flop circuit 26, and the output terminal of the AND circuit 25 is connected to the reset terminal R of the flip-flop circuit 26.

A first input terminal of the AND circuit 27 is connected to an output terminal Q of the flip-flop circuit 26, and a second input terminal of the AND circuit 27 is connected to the other output of the output control circuit 10 (i.e., an auxiliary switch drive timing signal Tra1t). The output terminal of the AND circuit 27 is connected to the gate of the auxiliary switch Tra1.

Figure 3:
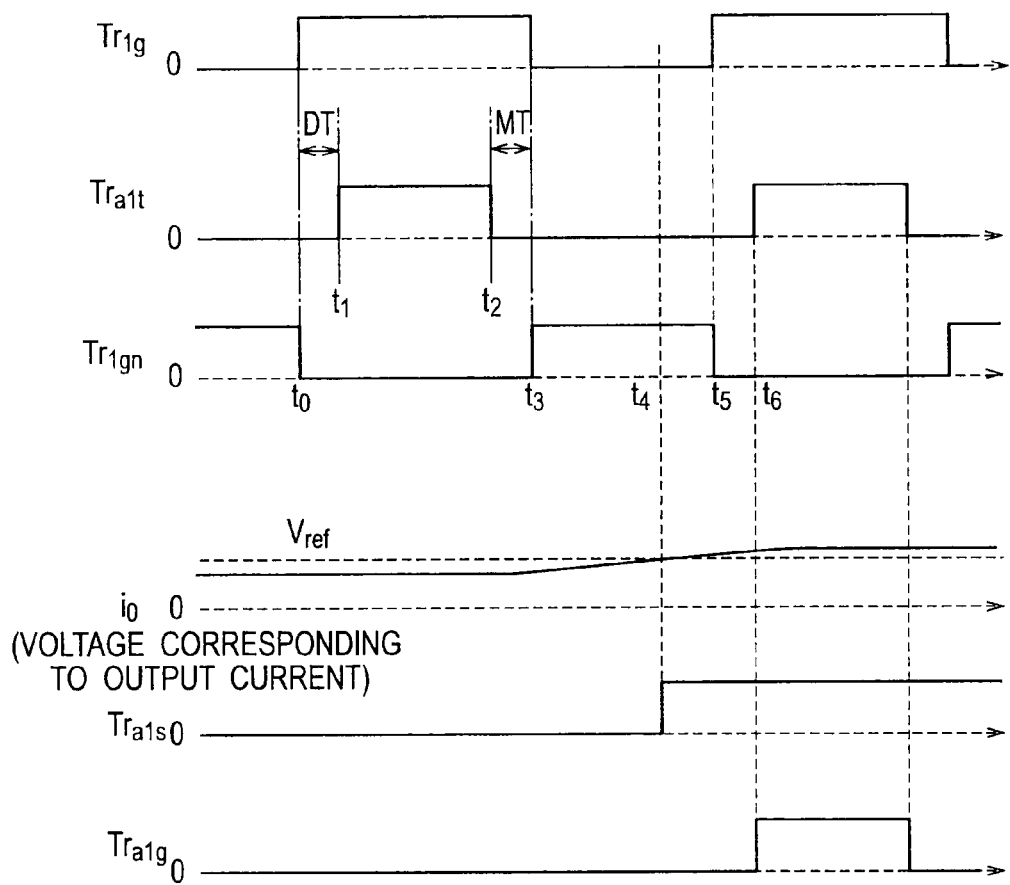
FIG. 3 is a timing chart showing how each component operates in the auxiliary loop operation switching control circuit provided in the DC-DC converter of Example 1.

Next, descriptions will be provided for how the auxiliary loop operation switching control circuit 20 shown in FIG. 2 performs a control operation of switching the soft-switching circuit between the operating mode and the non-operating mode while referring to the timing chart shown in FIG. 3.

In FIG. 3, Tr1g denotes the main switch gate signal applied from the output control circuit 10 to the gate of the main switch Tr1; Tra1t, the auxiliary switch drive timing signal outputted from the output control circuit 10 to the AND circuit 27; Tr1gn, a signal obtained by inverting the main switch gate signal Tr1g; Tra1s, an auxiliary loop operation switching signal from the flip-flop circuit 26; and Tra1g, an auxiliary switch gate signal applied from the AND circuit 27 to the gate of the auxiliary switch Tra1.

A delay time DT (t0-t1) from the main switch gate signal Tr1g to the auxiliary switch drive timing signal Tra1t is based on consideration given to a fall time of an electric current which flows through the reactor L1 and the diode D1. A margin time MT (t2-t3) from the auxiliary switch drive timing signal Tra1t to the main switch gate signal Tr1g is based on consideration given to half a time of the resonance between the reactor La1 and the capacitor Ca1.

First of all, from time t0 through time t3, the main switch gate signal Tr1g from the output control circuit 10 is inverted by the inverter 23, as well as the inverted signal Tr1gn is inputted into the first input terminals of the respective AND circuits 24, 25. From time t1 to time t2, the auxiliary switch drive timing signal Tra1t is inputted into the first input terminal of the AND circuit 27.

The comparator 21 compares the voltage corresponding to the output current io with the reference voltage Vref. If the voltage corresponding to the output current io is lower than the reference voltage Vref (from time t0 to time t4), that is to say, if the load Ro is light, the comparator 21 outputs a low-level output. For this reason, an output from the AND circuit 24 and an input into the set terminal S of the flip-flop circuit 26 are at a low-level. Accordingly, the output (i.e., the auxiliary loop operation switching signal Tra1s) from the output terminal Q of the flip-flop circuit 26 and the output (the auxiliary switch gate signal Tra1g) from the AND circuit 27 are at the low-level.

Subsequently, at and after time t4, the voltage corresponding to the output current io is equal to or higher than the reference voltage Vref. In other words, the load Ro is heavy. For this reason, the comparator 21 outputs a high-level output. Hence, an output from the AND circuit 24 and an input into the set terminal S of the flip-flop circuit 26 are at a high-level. Accordingly, the output (i.e., the auxiliary loop operation switching signal Tra1s) from the output terminal Q of the flip-flop circuit 26 is at the high-level. That is to say, only while the main switch Tr1 is off, the auxiliary loop operating switching control circuit 20 can accept the auxiliary loop operation switching signal Tra1s.

Thereafter, at time t6, the auxiliary switch drive timing signal Tra1t at the high level and the auxiliary loop operation switching signal Tra1s at the high level are inputted into the AND circuit 27. For this reason, the output (the auxiliary switch gate signal Tra1g) from the AND circuit 27 is at the H level. Accordingly, the auxiliary switch Tra1 can be turned on.

As described above, the auxiliary loop operation switching control circuit 20 is capable of switching the soft-switching circuit between the operating mode (in which the auxiliary switch Tra1 is in the ON state) and the non-operating mode (in which the auxiliary switch Tra1 is in the OFF state) based on the electric current io sensed by the electric current sensor 8, that is to say, in accordance with the state of the load Ro.

Figure 4:
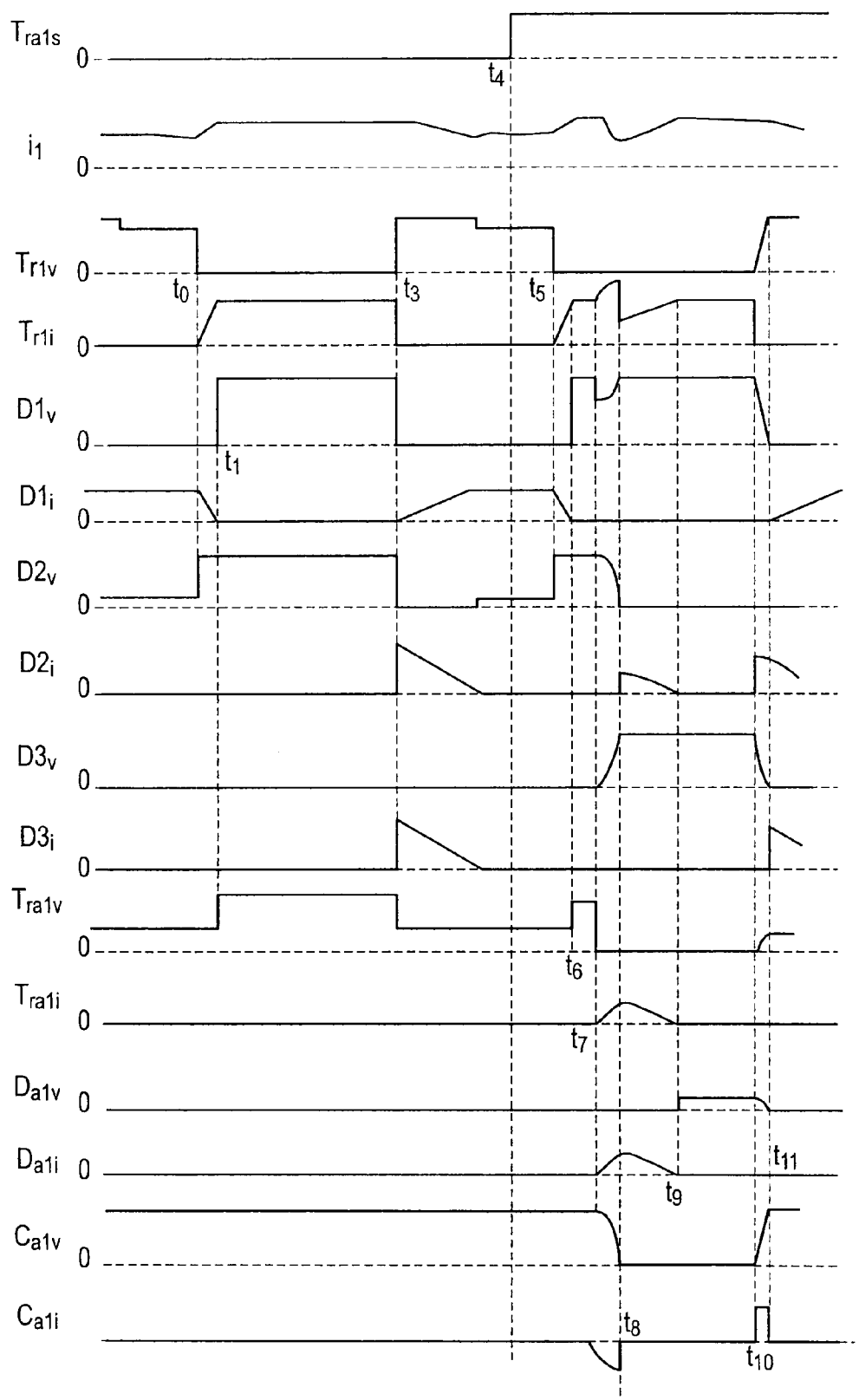
FIG. 4 is a timing chart showing how each component operates in the DC-DC converter of Example 1.

Next, detailed descriptions will be provided for how the soft-switching circuit operates while referring to FIG. 4 which is a timing chart showing how the DC-DC converter thus configured of Example 1 operates.

First of all, at time t0, the main switch Tr1 turns on in response to the main switch gate signal Tr1g from the output control circuit 10. On this occasion, an electric current flows through a path from the positive electrode to the negative electrode of the DC power supply Vi via the first primary winding 1a, the second primary winding 1b and the main switch Tr1. For this reason, an electric current i1 flowing through the primary winding 1a of the transformer T1 increases. An electric current D1i flowing through the diode D1 decreases, and the diode D1 accordingly turns off at time t1.

Subsequently, at time 3, the main switch Tr1 turns off in response to the gate signal from the output control circuit 10. Accordingly, a voltage Tr1v between the collector and emitter of the main switch Tr1 rises. Thereby, an electric current flows through a path from the positive electrode to the negative electrode of the DC power supply Vi via the primary winding 1a, the primary winding 1b, the diode D2, the diode D3 and the smoothing capacitor Co. For this reason, an electric current D2i flows through the diode D2, and an electric current D3i flows through the diode D3.

Nevertheless, the electric current which would otherwise have to flow through the diode D2 is commutated to the diode D1 due to a voltage applied to the hoist winding 1c of the transformer T1. For this reason, an electric current D1i flowing through the diode D1 increases. Accordingly, the electric current D2i flowing through the diode D2 and the electric current D3i flowing through the diode D3 decrease gradually.

Once electric currents respectively of the primary windings 1a, 1b and the hoist winding 1c of the transformer T1 are completely commutated to the diode D1, the diodes D2, D3 turn off. Because the diodes D2, D3 turn off after their electric currents gradually decrease, the occurrence of recovery loss is suppressed in each of the diodes D2, D3.

Thereafter, once the load becomes heavy and the voltage based on the output current io exceeds the reference voltage Vref at time t4 while the main switch Tr1 is off, the auxiliary loop operation switching signal Tra1s is turned on. Afterward, once the main switch Tr1 turns on at time t5, an electric current flowing through the main switch Tr1 linearly increases from time t5 through time t6.

Subsequently, once the auxiliary switch gate signal Tra1g becomes at the high level at time t6, the auxiliary switch Tra1 turns on. At time t7, an electric current Tra1i flows through the auxiliary switch Tra1. To put it specifically, once the auxiliary switch Tra1 turns on during the ON period of the main switch Tr1, the electric currents Tra1i and an electric current Da1i flow due to resonance between the capacitor Ca1 and the reactor La1 until time t8, and accordingly, electric charges with which the capacitor Ca1 are charged while the main switch Tr1 is off are returned to and regenerated in the DC power supply Vi.

Once the capacitor Ca1 finishes discharging the electric charges completely at time t8, that is to say, once the voltage Ca1v of the capacitor Ca1 reduces to zero at time t8, an electric current of the reactor La1 flows via the diode D2. At time t9, no electric current flows through the reactor La1 (i.e., no electric current Tra1i flows through the auxiliary switch Tra1, and no electric current Da1i flows through the diode Da1). Thereby, the diode Da1 blocks an electric current from flowing in the opposite direction. For this reason, the auxiliary loop terminates its operation with the capacitor Ca1 kept in a zero-voltage state.

On this occasion, neither the recovery of the diode Da1 nor the switching loss of the auxiliary switch Tra1 in the auxiliary loop causes a serious problem, because the electric currents respectively of the diode Da1 and the auxiliary switch Tra1 gradually change due to the resonance of the reactor La1 which has a sufficiently large inductance. In addition, once the auxiliary switch Tra1 is turned off, the main switch Tr1 will never perform a zero-voltage turn-off operation because no more electric charges are discharged from the capacitor Ca1.

Next, from time t10 through time t11, once the main switch Tr1 turns off, the capacitor Ca1 is charged from zero voltage. For this reason, the voltage Tr1v of the main switch Tr1 gradually rises. Accordingly, the zero-voltage turn-off soft-switching operation can be achieved.

As described above, the DC-DC converter of Example 1 is capable of reducing the switching loss which occurs each time the main switch Tr1 turns off because: the auxiliary loop operation switching control circuit 10 switches the soft-switching circuit between the operating mode and the non-operating mode in accordance with the state of the load Ro; and while in operation, the soft-switching circuit causes the main switch Tr1 to perform the soft-switching operation each time the main switch Tr1 turns off.

EXAMPLE 2

Figure 5:
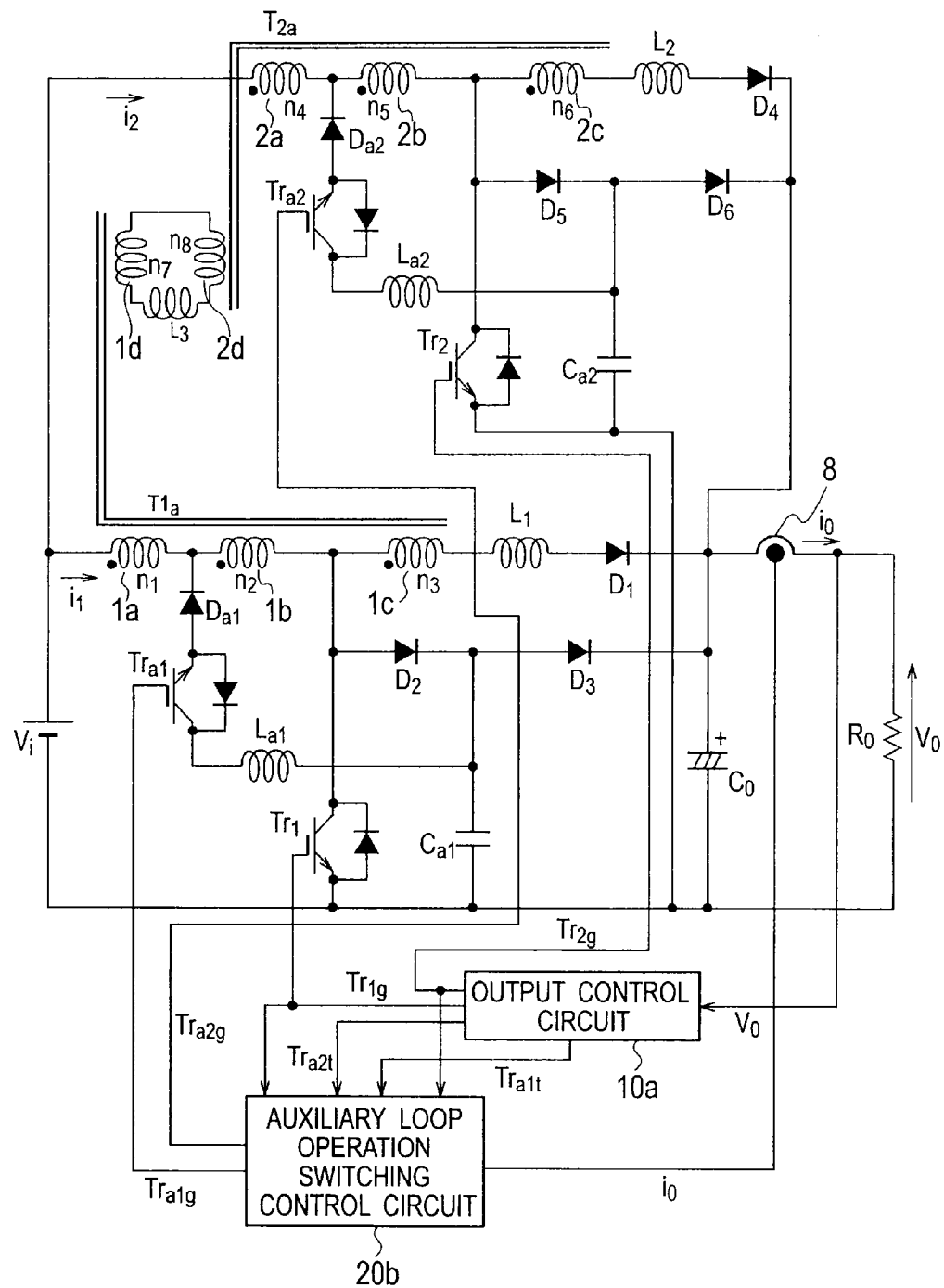
FIG. 5 is a circuit configuration diagram showing a DC-DC converter of Example 2.

FIG. 5 is a circuit configuration diagram showing a DC-DC converter of Example 2. A DC-DC converter shown in FIG. 5 includes a multi-phase trans-linked boost chopper circuit.

The DC-DC converter includes a DC power supply Vi, a transformer T1a (a first transformer), a transformer T2a (a second transformer), a reactor L1 (a first reactor), a reactor L2 (a second reactor), a reactor La1 (a fourth reactor), a reactor La2 (a fifth reactor), a reactor L3 (a third reactor), a main switch Tr1 (a first main switch), a main switch Tr2 (a second main switch), an auxiliary switch Tra1 (a first auxiliary switch), an auxiliary switch Tra2 (a second auxiliary switch), diodes D1 to D6 and Da1, Da2, capacitors Ca1, Ca2, a smoothing capacitor Co, an output control circuit 10a, and an auxiliary loop operation switching control circuit 20b.

The transformer T1a includes: a first primary winding 1a (the number of turns: n1); a second primary winding 1b (the number of turns: n2) connected to the first primary winding 1a in series; a hoist winding 1c (the number of turns: n3) connected to the second primary winding 1b in series; and a secondary winding 1d (the number of turns: n7) electromagnetically-coupled with the primary windings 1a, 1b and the hoist winding 1c. The transformer T2a is configured in the same manner as the transformer T1a, and includes: a first primary winding 2a (the number of turns: n4); a second primary winding 2b (the number of turns: n5) connected to the first primary winding 2a in series; a hoist winding 2c (the number of turns: n6) connected to the second primary winding 2b in series; and a secondary winding 2d (the number of turns: n8) electromagnetically-coupled with the primary windings 2a, 2b and the hoist winding 2c.

The corrector and emitter of the main switch Tr1 made from an IGBT are connected to the respective two ends of the DC power supply Vi via the first primary winding 1a and the second primary winding 1b of the transformer T1a. The corrector and emitter of the main switch Tr2 made from an IGBT are connected to the respective two ends of the DC power supply Vi via the first primary winding 2a and the second primary winding 2b of the transformer T2a.

A series circuit including the hoist winding 1c of the transformer T1a, the reactor L1, the diode D1 and the smoothing capacitor Co is connected to the two ends of the main switch Tr1. The reactor L1 may be a leakage inductance of the transformer T1a. A series circuit including the hoist winding 2c of the transformer T2a, the reactor L2, the diode D4 and the smoothing capacitor Co is connected to the two ends of the main switch Tr2. The reactor L2 may be a leakage inductance of the transformer T2a.

In addition, a series circuit including the diode D2, the diode D3 and the smoothing capacitor Co is connected to the two ends of the main switch Tr1. A series circuit including the diode D5, the diode D6 and the smoothing capacitor Co is connected to the two ends of the main switch Tr2. A load Ro is connected to the two ends of the smoothing capacitor Co. An electric current sensor 8 configured to sense an electric current (an output current) io flowing through the load Ro is inserted between the smoothing capacitor Co and the load Ro.

A series circuit including the diode Da1, the auxiliary switch Tra1 made from an IGBT, the reactor La1 and the capacitor Ca1 is connected to a connection point between the first primary winding 1a and the second primary winding 1b of the transformer T1a, and is connected to the negative electrode of the DC power supply Vi. A connection point between the reactor La1 and the capacitor Ca1 is connected to a connection point between the diode D2 and the diode D3. The diode Da1, the auxiliary switch Tra1, the reactor La1 and the capacitor Ca1 constitute a first soft-switching circuit.

A series circuit including the diode Da2, the auxiliary switch Tra2 made from an IGBT, the reactor La2 and the capacitor Ca2 is connected to a connection point between the first primary winding 2a and the second primary winding 2b of the transformer T2a, and is connected to the negative electrode of the DC power supply Vi. A connection point between the reactor La2 and the capacitor Ca2 is connected to a connection point between the diode D5 and the diode D6. The diode Da2, the auxiliary switch Tra2, the reactor La2 and the capacitor Ca2 constitute a second soft-switching circuit.

The reactor L3 is connected to the two ends of a series circuit including the secondary winding 1d of the transformer T1a and the secondary winding 2d of the transformer T2a. Based on an output voltage Vo from the load Ro, the output control circuit 10a turns on the main switch Tr1 and the main switch Tr2 alternately, and turns off the first main switch Tr1 and the second main switch Tr2 alternately after keeping the main switch Tr1 and the main switch Tr2 turned on for a while. The auxiliary loop operation switching control circuit 20b switches each of the first soft-switching circuit and the second soft-switching circuit between the operating mode and the non-operating mode based on the electric current io sensed by the electric current sensor 8, that is to say, in accordance with the state of the load Ro (an amount of load).

Figure 6:
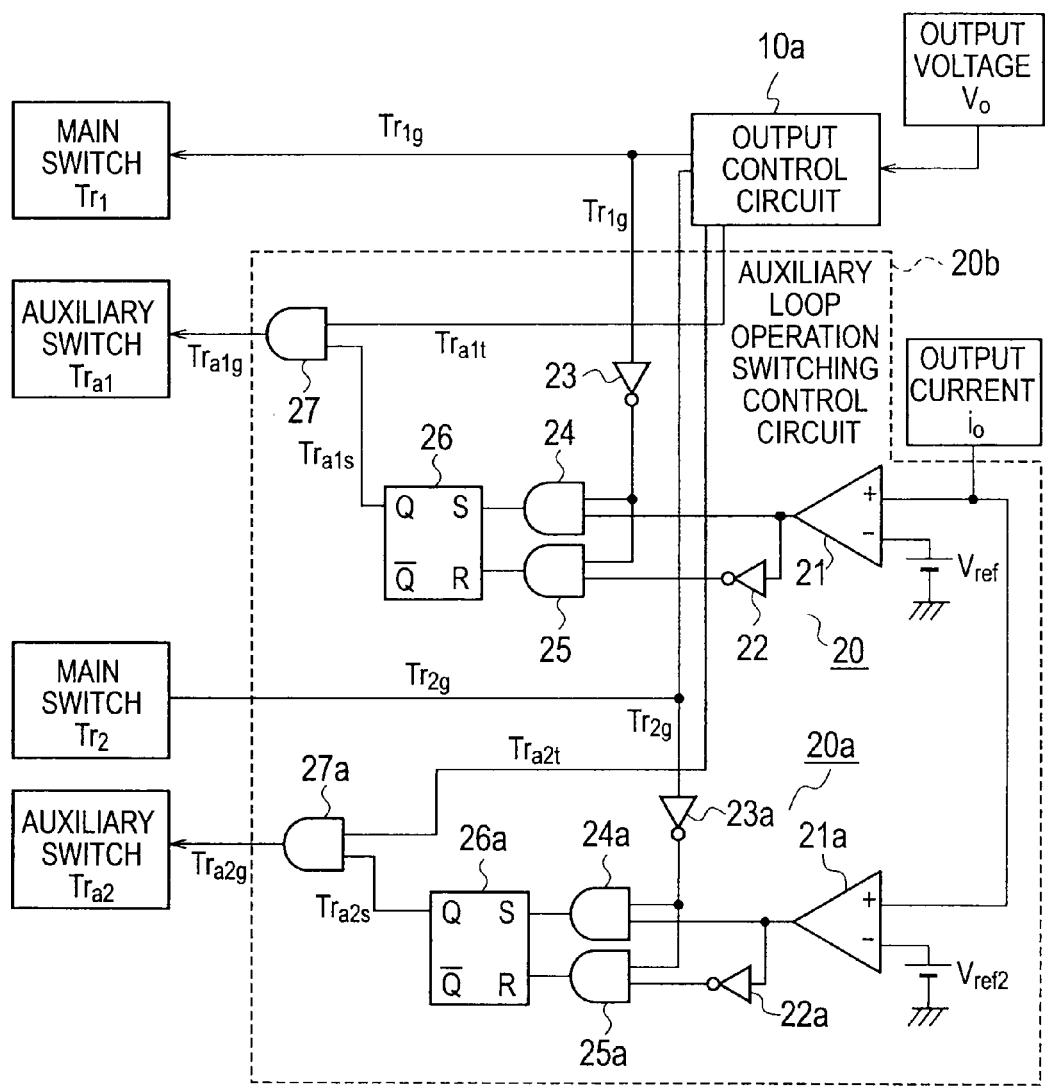
FIG. 6 is a circuit configuration diagram of an auxiliary loop operation switching control circuit provided in the DC-DC converter of Example 2.

FIG. 6 is a circuit configuration diagram of an auxiliary loop operation switching control circuit provided in the DC-DC converter of Example 2. The auxiliary loop operation switching control circuit 20b includes: the auxiliary loop operation switching control circuit 20 of Example 1, which is shown in FIG. 2; and an auxiliary loop operation switching control circuit 20a having the same configuration as the auxiliary loop operation switching control circuit 20.

The auxiliary loop operation switching control circuit 20a includes a comparator 21a, inverters 22a, 23a, AND circuits 24a, 25a, a flip-flop circuit 26a, and an AND circuit 27a. The auxiliary loop operation switching control circuit 20a turns on and off the auxiliary switch Tra2 based on a signal from the AND circuit 27a.

It should be noted that the transformer T1a, the reactors L1, La1, the diodes D1 to D3 and Da1, the capacitor Ca1, the main switch Tr1, the auxiliary switch Tra1, and the auxiliary loop operation switching control circuit 20 constitute a first converter. The transformer T2a, the reactors L2, La2, the diodes D4 to D6 and Da2, the capacitor Ca2, the main switch Tr2, the auxiliary switch Tra2, and the auxiliary loop operation switching control circuit 20a constitute a second converter.

Descriptions will be herein omitted for the operation of controlling the switching of the soft-switching circuit between the operating mode and the non-operating mode, which is performed by the auxiliary loop operation switching control circuit 20b shown in FIG. 6, because the operation is the same as the operation of controlling the switching of the soft-switching circuit between the operating mode and the non-operating mode, which is performed by the auxiliary loop operation switching control circuit 20 of Example 1 shown in FIG. 2.

In sum, the auxiliary loop operation switching circuit 20b is capable of switching the soft-switching circuit between the operating mode and the non-operating mode based on+ the electric current io sensed by the electric current sensor 8, that is to say, in accordance with the state of the load Ro as well.

Figure 7:
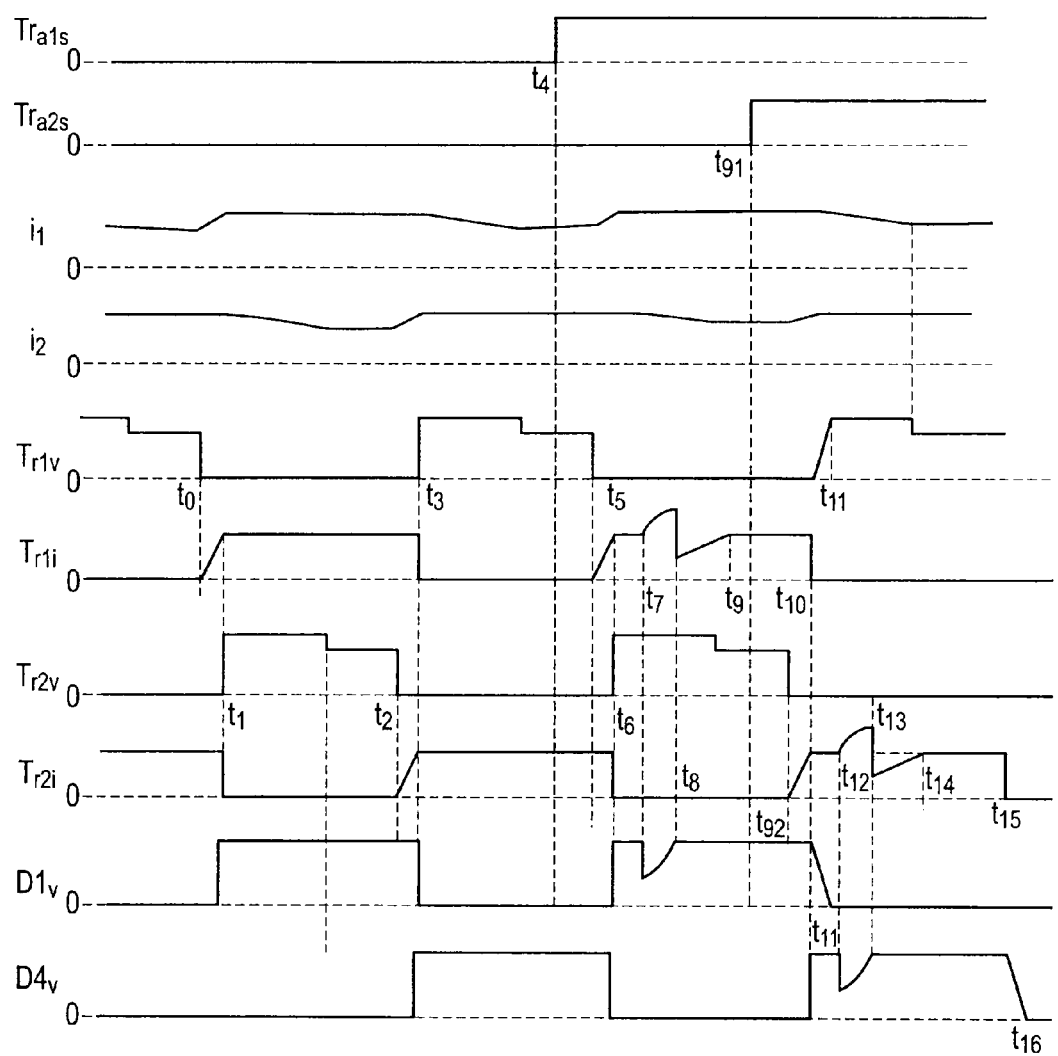
FIG. 7 is a timing chart showing how each component operates in the auxiliary loop operation switching control circuit provided in the DC-DC converter of Example 2.

Next, descriptions will be provided for how the thus-configured DC-DC converter of Example 2 operates while referring to a timing chart shown in FIG. 7.

It should be noted that: an interval between time t0 and time t2 corresponds to a half cycle; and an interval between time t0 and time t1 as well as an interval between time t2 and time t3 is an overlap period in which the main switch Tr1 and the main switch Tr2 are ON simultaneously. In addition, it should be noted that, although FIG. 7 shows only waveforms which represent the operations of the respective main components, the operation of the first converter including the foregoing main switch Tr1 precedes the operation of the second converter including the foregoing main switch Tr2 by a half cycle.

First of all, at time t0, the main switch Tr1 turns on in response to a gate signal Tr1g from the output control circuit 10a. On this occasion, an electric current flows through a path from the positive electrode to the negative electrode of the DC power supply Vi via the primary winding 1a, the primary winding 1b and the main switch Tr1. For this reason, an electric current it flowing through the primary windings 1a, 1b of the transformer T1a increases. A voltage is generated in the secondary winding 1d of the transformer T1a as well. Accordingly, an electric current flows through the reactor L3 through a path which starts at and returns to the secondary winding 1d via the secondary winding 2d and the reactor L3.

Subsequently, at time t1, the main switch Tr2 turns off in response to a gate signal Tr2g from the output control circuit 10a, and a voltage Tr2v between the corrector and emitter of the main switch Tr2 rises. Thereby, an electric current flows through a path from the positive electrode to the negative electrode of the DC power supply Vi via the primary winding 2a, the primary winding 2b, the diode D5, the diode D6 and the smoothing capacitor Co. For this reason, electric currents flow through the respective diodes D5, D6, respectively.

An electric current of the reactor L2 increases due to a voltage applied to the hoist winding 2c of the transformer T2a. For this reason, the electric currents flowing through the respective diodes D5, D6 decrease gradually. Once the electric currents flowing through the respective primary windings 2a, 2b of the transformer T2a are completely commutated to the diode D4, the diodes D5, D6 turn off. An output voltage Vo from the smoothing capacitor Co becomes equal to a sum of a voltage (an input voltage) of the DC power supply Vi, voltages generated in the respective primary windings 2a, 2b of the transformer T2a, and a voltage generated in the hoist winding 2c of the transformer T2a.

Once the main switch Tr2 turns on in response to the gate signal Tr2g from the output control circuit 10a at time t2, electric currents respectively flowing through the primary windings 2a, 2b and the hoist winging 2c of the transformer T2a start to be commutated from the diode D4 to the main switch Tr2. Because an electric current flows through a path from the positive electrode to the negative electrode of the DC power supply Vi via the primary winding 2a, the primary winding 2b and the main switch Tr2, an electric current i2 flowing through the primary windings 2a, 2b of the transformer T2a increases. A voltage is generated in the secondary winding 2d of the transformer T2a as well. Accordingly, an electric current flows through the reactor L3 through a path which starts at and returns to the secondary winding 2d via the reactor L3 and the secondary winding 1d.

At time t3, the main switch Tr1 turns off in response to the gate signal Tr1g from the output control circuit 10a, and accordingly, the voltage Tr1v between the collector and emitter of the main switch Tr1 rises. Thereby, an electric current flows through a path from the positive electrode to the negative electrode of the DC power supply Vi via the primary winding 1a, the primary winding 1b, the diode D2, the diode D3 and the smoothing capacitor Co. For this reason, electric currents flow through the diodes D2, D3, respectively.

An electric current of the reactor L1 increases due to a voltage applied to the hoist winding 1c of the transformer T1a. For this reason, electric currents flowing through the respective diodes D2, D3 decrease gradually. Once electric currents respectively flowing through the primary windings 1a, 1b of the transformer T1a are completely commutated to the diode D1, the diodes D2, D3 turn off.

Subsequently, once the load becomes heavy and the voltage based on the output current io exceeds the reference voltage Vref at time t4 while the main switch Tr1 is off, the auxiliary loop operation switching signal Tra1s is turned on. Thereafter, once the main switch Tr1 turns on at time t5, an electric current flowing through the main switch Tr1 linearly increases from time t5 through time t6.

Afterward, once the auxiliary switch gate signal Tra1g becomes at the high level at time t6, the auxiliary switch Tra1 turns on. At time t7, an electric current Tra1i flows through the auxiliary switch Tra1. To put it specifically, once the auxiliary switch Tra1 turns on during the ON period of the main switch Tr1, the electric current Tra1i and a Da1i flow due to the resonance between the capacitor Ca1 and the reactor La1 until time t8, and accordingly, electric charges with which the capacitor Ca1 is charged while the main switch Tr1 is off are returned to and regenerated in the DC power supply Vi.

Once the capacitor Ca1 finishes discharging the electric charges completely at time t8, that is to say, once the voltage Ca1v of the capacitor Ca1 reduces to zero at time t8, an electric current of the reactor La1 flows via the diode D2. At time t9, no electric current flows through the reactor La1. Thereby, the diode Da1 blocks an electric current from flowing in the opposite direction. For this reason, the auxiliary loop terminates its operation with the capacitor Ca1 kept in a zero-voltage state.

On this occasion, neither the recovery of the diode Da1 nor the switching loss of the auxiliary switch Tra1 in the auxiliary loop causes a serious problem, because the electric currents respectively of the diode Da1 and the auxiliary switch Tra1 gradually change due to the resonance of the reactor La1 which has a sufficiently large inductance. In addition, once the auxiliary switch Tra1 is turned off, the main switch Tr1 will never perform a zero-voltage turn-off operation because no more electric charges are discharged from the capacitor Ca1.

Next, from time t10 through time t11, once the main switch Tr1 turns off, the capacitor Ca1 is charged from zero voltage. For this reason, the voltage Tr1v of the main switch Tr1 gradually rises. Accordingly, the zero-voltage turn-off soft-switching operation can be achieved.

Meanwhile, once the load becomes heavy and the voltage based on the output current io exceeds the reference voltage Vref2 at time t91 while the main switch Tr2 is off, the auxiliary loop operation switching signal Tra2s is turned on. Thereafter, once the main switch Tr2 turns on at time t92, an electric current flowing through the main switch Tr2 linearly increases from time t92 through time t10.

Afterward, once the auxiliary switch gate signal Tra2g becomes at the high level at time t10, the auxiliary switch Tra2 turns on. At time t12, an electric current Tra2i flows through the auxiliary switch Tra2. To put it specifically, once the auxiliary switch Tra2 turns on during the ON period of the main switch Tr2, the electric current Tra2i and a Da2i flow due to the resonance between the capacitor Ca2 and the reactor La2 until time t13, and accordingly, electric charges with which the capacitor Ca2 is charged while the main switch Tr2 is off are returned to and regenerated in the DC power supply Vi.

Once the capacitor Ca2 finishes discharging the electric charges completely at time t13, an electric current of the reactor La2 flows via the diode D5. At time t14, no electric current flows through the reactor La2. Thereby, the diode Da2 blocks an electric current from flowing in the opposite direction. For this reason, the auxiliary loop terminates its operation with the capacitor Ca2 kept in a zero-voltage state.

On this occasion, neither the recovery of the diode Da2 nor the switching loss of the auxiliary switch Tra2 in the auxiliary loop causes a serious problem, because the electric currents respectively of the diode Da2 and the auxiliary switch Tra2 gradually change due to the resonance of the reactor La2 which has a sufficiently large inductance. In addition, once the auxiliary switch Tra2 is turned off, the main switch Tr2 will never perform a zero-voltage turn-off operation because no more electric charges are discharged from the capacitor Ca2.

Next, from time t15 through time t16, once the main switch Tr2 turns off, the capacitor Ca2 is charged from zero voltage. For this reason, the voltage Tr2v of the main switch Tr2 gradually rises. Accordingly, the zero-voltage turn-off soft-switching operation can be achieved.

As described above, the multi-phase trans-linked boost chopper circuit of Example 2 operates in the same manner as the single-phase boost chopper circuit of Example 1, and offers the same effects as the single-phase boost chopper circuit of Example 1.

The present invention can reduce the switching loss which occurs each time the main switch turns off because: the switching control circuit switches the soft-switching circuit between the operating mode and the non-operating mode in accordance with the state of the load; and while in operation, the soft-switching circuit causes the main switch to perform a soft-switching operation when the main switch turns off.

The present invention can be applied to hybrid vehicles and electric vehicles.

What is claimed is:

1. A DC-DC converter comprising:
    a main switch connected to two ends of a DC power supply via a first primary winding and a second primary winding of a transformer, the second primary winding connected to the first primary winding in series;
    a first series circuit connected to two ends of the main switch, and including a hoist winding, a first reactor, a first diode and a smoothing capacitor, the hoist winding connected to the second primary winding in series;
    a second series circuit connected to the two ends of the main switch, and including a second diode, a third diode and the smoothing capacitor;
    a soft-switching circuit configured to cause the main switch to perform a soft-switching operation each time the main switch turns off;
a control circuit configured to turn on and off the main switch; and
    a switching control circuit configured to switch the soft-switching circuit between an operating mode and a non-operating mode in accordance with a state of a load;
    wherein
    the soft-switching circuit includes a third series circuit including a fourth diode, an auxiliary switch, a second reactor and a capacitor, the third series circuit including one end connected to a connection point between the first primary winding and a second primary winding of the transformer, and another end connected to a negative electrode of the DC power supply, and
    a connection point between the second reactor and the capacitor is connected to a connection point between the second diode and the third diode.

2. The DC-DC converter according to claim 1, wherein the first reactor is made of a leakage inductance of the transformer.

3. A DC-DC converter comprising:
    a first main switch connected to two ends of a DC power supply via a first primary winding and a second primary winding of a first transformer, the second primary winding connected to the first primary winding of the first transformer in series;
a first series circuit connected to two ends of the first main switch, and including a hoist winding, a first reactor, a first diode and a smoothing capacitor, the hoist winding connected to the second primary winding of the first transformer in series;
a second series circuit connected to the two ends of the first main switch, and including a second diode, a third diode and the smoothing capacitor;
    a second main switch connected to two ends of the DC power supply via a first primary winding and a second primary winding of a second transformer, the second primary winding connected to the first primary winding of the second transformer in series;
    a third series circuit connected to the two ends of the second main switch, and including a hoist winding, a second reactor, a fourth diode and the smoothing capacitor, the hoist winding connected to the second primary winding of the second transformer in series;
a fourth series circuit connected to the two ends of the second main switch, and including a fifth diode, a sixth diode and the smoothing capacitor;
a third reactor connected to two ends of a series circuit including a secondary winding of the first transformer and a secondary winding of the second transformer;
    a control circuit turns on the first main switch and the second main switch alternately, and turns off the first main switch and the second main switch alternately after keeping the first main switch and the second main switch turned on for a while;
a first soft-switching circuit configured to cause the first main switch to perform a soft-switching operation each time the first main switch turns off;
a second soft-switching circuit configured to cause the second main switch to perform a soft-switching operation each time the second main switch turns off; and
    a switching control circuit switches each of the first soft-switching circuit and the second soft-switching circuit between an operating mode and a non-operating mode in accordance with the state of the load.

4. The DC-DC converter according to claim 3, wherein
    the first soft-switching circuit includes a series circuit including a seventh diode, a first auxiliary switch, a fourth reactor and a first capacitor, the series circuit including one end connected to a connection point between the first primary winding and the second primary winding of the first transformer, another end connected to a negative electrode of the DC power supply,
    a connection point between the fourth reactor and the first capacitor is connected to a connection point between the second diode and the third diode,
    the second soft-switching circuit includes a series circuit including an eighth diode, a second auxiliary switch, a fifth reactor and a second capacitor, the series circuit including one end connected to a connection point between the first primary winding and the second primary winding of the second transformer, and another end connected to the negative electrode of the DC power supply, and
    a connection point between the fifth reactor and the second capacitor is connected to a connection point between the fifth diode and the sixth diode.

5. The DC-DC converter according to claim 4, wherein
    the first reactor is made of a leakage inductance of the first transformer, and
    the second reactor is made of a leakage inductance of the second transformer.

* * * * *